Aug. 17, 1926.

A. DUTREUX 1,596,517

COUPLING DEVICE FOR AUTOMOBILE SELF STARTERS AND DYNAMOS

Filed June 9, 1925 3 Sheets-Sheet 1

Inventor:
Auguste Dutreux

Aug. 17, 1926. 1,596,517
A. DUTREUX
COUPLING DEVICE FOR AUTOMOBILE SELF STARTERS AND DYNAMOS
Filed June 9, 1925     3 Sheets-Sheet 2
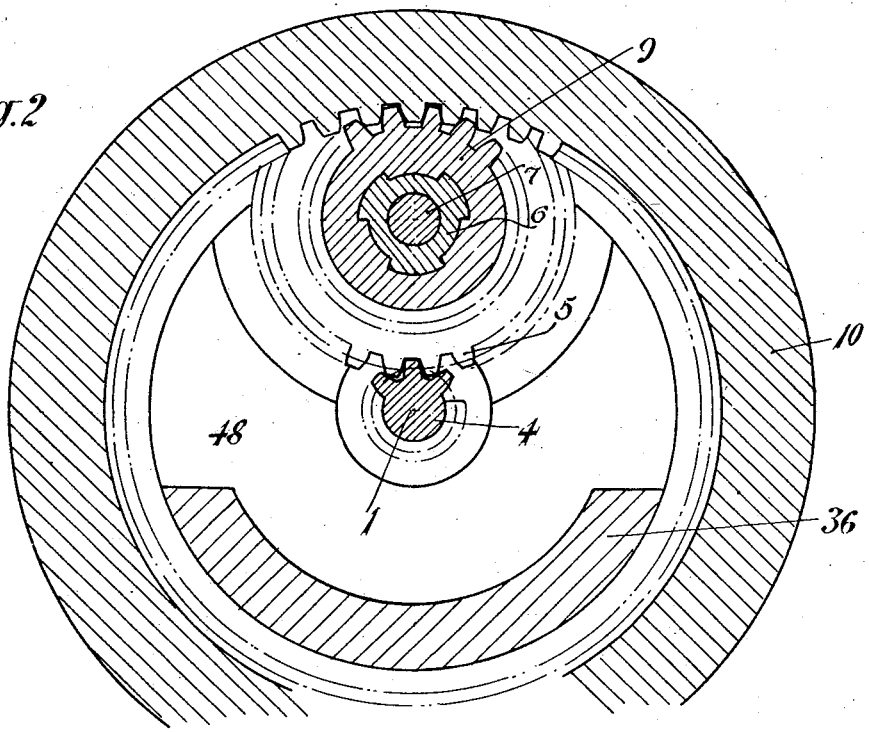
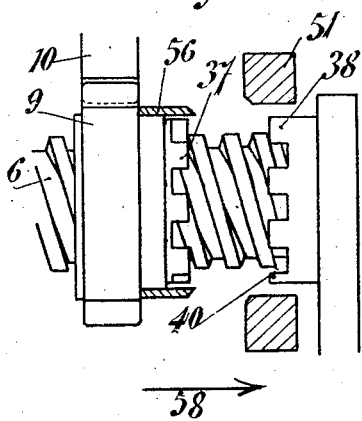
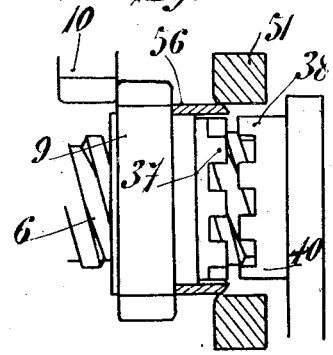
Inventor:
Auguste Dutreux

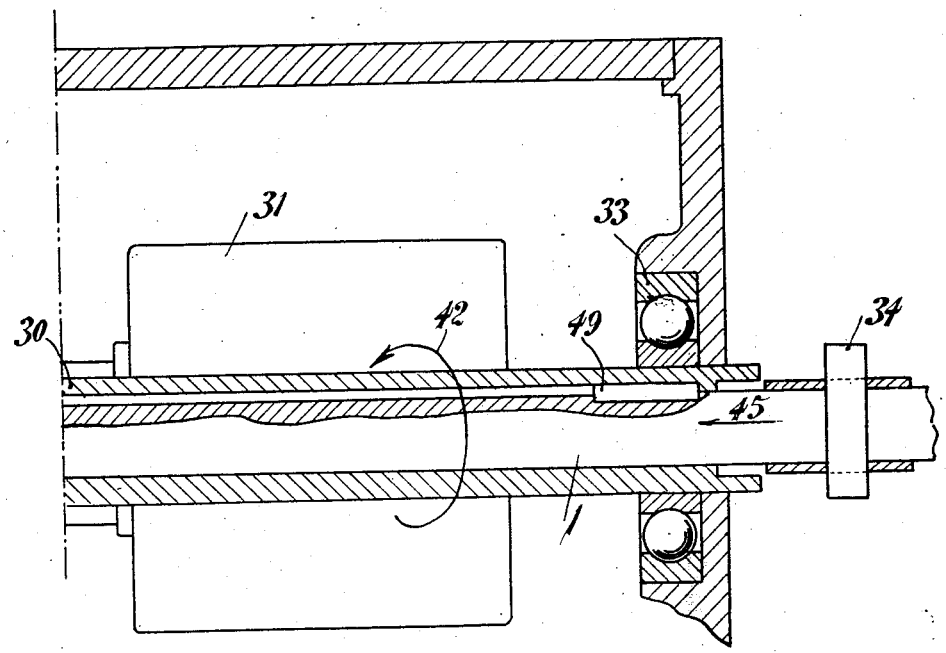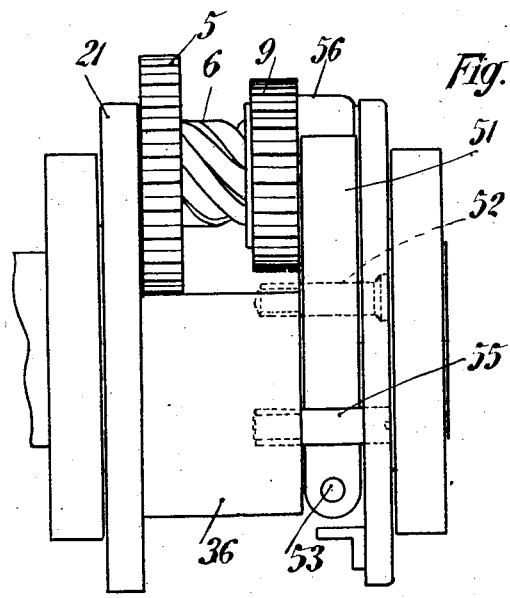

Patented Aug. 17, 1926.

1,596,517

UNITED STATES PATENT OFFICE.

AUGUSTE DUTREUX, OF ISSY-LES-MOULINEAUX, FRANCE, ASSIGNOR TO SOCIÉTÉ ANONYME POUR L'EQUIPEMENT ELECTRIQUE DES VEHICULES, OF ISSY-LES-MOULINEAUX, FRANCE, A JOINT STOCK COMPANY OF FRANCE.

COUPLING DEVICE FOR AUTOMOBILE SELF-STARTERS AND DYNAMOS.

Application filed June 9, 1925, Serial No. 36,064, and in France September 15, 1924.

It has already been proposed to couple an electromagnetic machine with an automobile engine, the said machine acting either as a starter or as a generating dynamo for charging the storage battery or accumulators, feeding lamps, or other apparatus.

When the electromagnetic machine acts as starter it is geared to the internal combustion engine and can thus drive, with a relatively weak connection and high speed, an internal combustion engine having a relatively high resistance, giving it, however, a sufficient speed for starting it.

As soon as the engine is running, the speed should be automatically reduced and the electric machine, then working as a generator, be directly driven at the same speed as the engine.

The present invention relates to a coupling device for obtaining the foregoing results and consists of a planet pinion coupling fixed to the shaft of the engine, the pinions of said coupling gearing with a pinion fixed on the shaft of the electromagnetic machine or dynamo.

My improved device also comprises a sliding pinion moved by a threaded sleeve mounted loosely on the shaft of each planet wheel, said sliding pinion being displaced in one direction or the other on said casing according to the stresses it has to support, so that said sliding pinion in starting will gear with a fixed orbit wheel and run on that wheel, thus reducing the speed between the engine shaft and that of the electromagnetic machine, whereas in order to make the electromagnetic machine work as a generator, said sliding pinion separates from the planet wheel and thus allows the engine shaft to be coupled directly with the shaft of the electric machine.

My invention also comprises the other features which will be apparent from the appended claims.

The electromagnetic machine will be hereinafter referred to as a "dynamo" or "electric motor" according to the use to which it is being put.

A preferred form of the invention has been illustrated in the accompanying drawings, in which:

Figs. 1 and 1ᴀ constitute when placed together an axial longitudinal section of the improved device.

Fig. 2 is a transverse section along the line 2—2—2 in Fig. 1.

Fig. 4 is a partial view of the speed reducing mechanism.

Figs. 5 and 6 are two plan views of a portion of the device shown in Fig. 4, the sliding pinion being shown in two different positions.

Figure 1:
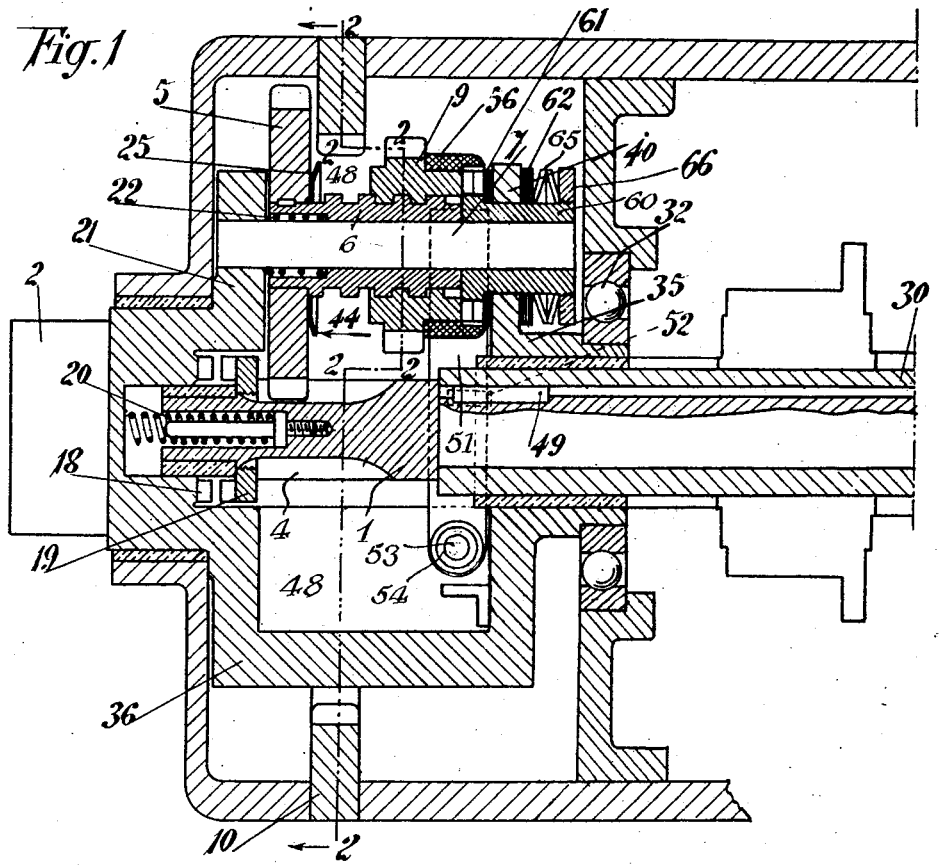

The hollow shaft 30, on which the armature 31 of the electromagnetic machine is secured runs in two ball bearings 32 and 33.

A solid shaft 1 equipped at its outer end with a key 34, by means of which a starting crank can be connected thereto is connected with the hollow shaft 30 of the armature 31 by means of a long key 49 which allows the solid shaft 1 to slide in the said hollow shaft, while in its rotary movements.

Shaft 1 has a toothed pinion 4 on its inner end, with which the planet pinion 5 engages.

There are clutch teeth 19 at the inner end of shaft 1 which teeth can engage corresponding teeth 18 on the shaft 2 of the engine. A helical spring 20 placed between shaft 1 and engine shaft 2 tends to constantly separate these shafts as shown in Fig. 1.

The planet pinion 5 is keyed on a sleeve 6 formed with a quick thread. The sleeve 6 can turn freely on a spindle 7, one end of which is fitted into a disc 21 which carries the planet pinion and is formed integral with the shaft 2 of the engine, the other end of said spindle being fitted into a disc 35, the two discs 21 and 35 being made in one piece being connected by the part 36 so as to impart stability to the various parts of the transmission mechanism and to maintain them in proper relation to the axis of the apparatus. Part 36 is cut away or shaped to provide a space 48 in which the various parts of the device are enclosed.

A spring 22 placed between the coupling disc 21 and threaded sleeve 6 tends to continually press the latter away from the said disc.

A sliding pinion 9 is adapted to screw upon the threaded sleeve 6 from one end thereof to the other; this pinion 9 is provided on one of its sides with cogs 37 (Fig.

5) adapted to engage with the cogs 38 of a clutch coupling 60 mounted loosely on the spindle 7 and fitted in the disc 35.

Two washers 61, 62, made of a material having a constant coefficient of friction (for example ferodo) are threaded on the clutch 60 on either side of the disc 35. Belleville washers 65 compressed by a nut 66 screwed on the clutch coupling 60 produce an elastic tightening of the combined clutch 60, washers 61, 62 and disc 35. This device thus constitutes a friction and sliding coupling by which the stress is limited.

Two jaws 51 are pivoted at 52 on the disc 35, and an adjustable spindle 53 connects the lower part of the jaws 51 holding in place a helical spring 54 placed between said jaws 51.

The two jaws 51, under the action of spring 54, grip a brake ring 56 made integral with the sliding pinion 9 which screws upon the sleeve 6.

Figure 3:
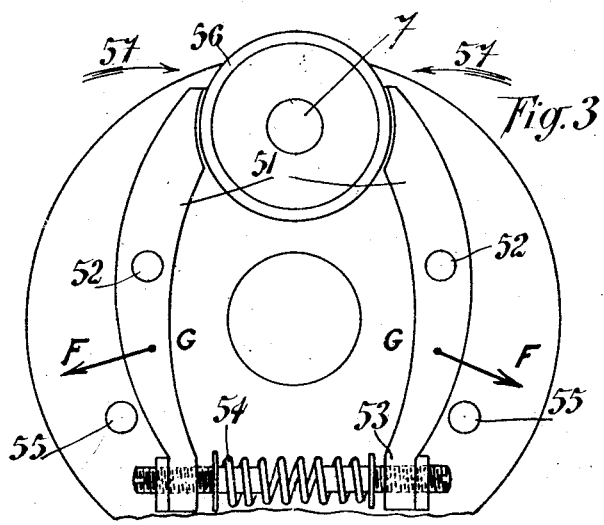
Fig. 3 is a side view of a pair of brake jaws for arresting or releasing the sliding pinion.

Two stops 55 provided on the disc 35, limit the movement of the jaws 51 about their pivots 52 in the direction of the arrows 57 in Fig. 3.

The pivots 52 are above the centres of gravity G of the two jaws 51. Consequently, when said jaws are carried round by the rotation of disc 35, the centifrugal power F applied at the centres of gravity G assists spring 54 to turn the jaws in the direction 57 thus assuring the gripping of the sliding pinion 9 between the jaws.

An internally toothed wheel 10 is fixed in the casing of the apparatus and is adapted to engage with the sliding pinion 9.

The operation is as follows:

(a) In the first place, the electric motor when acting as a starter must drive the engine shaft 2 at a reduced speed.

When the apparatus is at rest in the position shown in Fig. 1, the cogs 37 of the sliding pinion 9 are engaged with the cogs 38 of the clutch 60.

Current being now switched on to the electric motor, the hollow shaft 30 by means of the long keys 49 drives shaft 1 in the direction of the arrow 42. (Fig. 1A.)

The pinion 4 drives the planet pinion 5 and the threaded sleeve 6 keyed to said pinion, these two members turning freely on the spindle 7, the sleeve 6 being loose on said spindle.

Sleeve 6 moves the sliding pinion 9 forward in the direction 44 (Fig. 1.), without rotating said pinion. Moreover, pinion 9 is prevented from turning during its initial motion owing to its cogs 37 being engaged with cogs 38 of the clutch 60, the latter being unable to turn on its axis owing to the friction of the washers 61, 62, placed between clutch 60 and disc 35.

The sliding pinion 9 thus is released from the cogs 38, but the action of these cogs is prolonged by the jaws 51 which press against the brake ring 56 of the sliding pinion 9 thus preventing pinion 9 from rotating.

In sliding in the direction 44, the sliding pinion 9 engages with the fixed orbit wheel 10 which again prevents its rotation.

Sliding pinion 9 presses against an elastic washer 25 on the planet pinion 5 which prevents impact between the said parts. Pinion 5 and sleeve 6 are thus displaced in the direction 44 and compress the spring 22, which prevents all impact at the time of starting. Finally, the advance of the pinion 9 in the direction 44 is arrested; and the pinion 9 now firmly bearing against the planet pinion 5 turns with it and begins to rotate on the orbit wheel 10 and consequently drives the spindle 7 around shaft 1.

The spindle 7 drives the planet gear disc 21 and shaft 2 of the engine at a decreased speed which is a function of the various diameters of the planet gear system thus constituted.

(b) After the internal combustion engine has been started shaft 2 will rotate in the same direction as before, but at much greater speed, and, in turn, picks up and drives the planet pinion disc 21 and spindle 7.

Thereby, the reaction of the fixed orbit wheel 10 on the sliding pinion 9 is changed in direction. Moreover the planet pinion 5 rotates on the pinion 4 and its rotation causes threaded sleeve 6 to turn in such a way that its reaction on the sliding pinion 9 causes the latter to advance in the direction 58 (Fig. 5). Sliding pinion 9 now leaves the orbit wheel 10 and moves in the direction 58 on sleeve 6.

The brake ring 56 is caught between the brake jaws 51 which grip it preventing rotation of the sliding pinion 9. This braking action of the jaws 51 begins before the sliding pinion 9 has completely escaped from the orbit wheel 10, so that pinion 9 is constantly prevented from turning on its axis; it therefore only moves longitudinally in the direction 58.

Continuing to advance in the direction 58 the cogs 37 of pinion 9 finally engage again the cogs 38 of the clutch 60.

During normal operation of the gear, the friction produced between the ferodo washers 61, 62 the disc 35 and the clutch casing 60 is sufficient to prevent all rotation of this clutch 60 around its axis.

Consequently the pinion 9 is made interdependent with the disc 35; pinion 9, sleeve 6 and the planet pinion 5 cannot turn with respect to the discs 35, 21 which thus directly carry along by means of pinion 4, shaft 1, the hollow shaft 30 and the armature 31, and the direct coupling of the engine shaft 2 and the hollow shaft 30 is effected, the electro-magnetic machine then acting as a dynamo to charge the battery or accumulators.

Should an excessive effort be produced as the sliding pinion 9 engages with the clutch 60, because the motor starts too suddenly or the dynamo shaft 30 rotates too quickly, the clutch 60 turns, in relation to the disc 35, thus allowing pinion 9, clutch 60 and planet pinion 5 to continue turning on the spindle 7.

This sliding movement gives an automatic stoppage in the transmission of motion between the engine shaft 2 and the shaft 30 of the electromagnetic machine preventing any excessive stresses in the mechanism.

As soon as the cause for producing this excessive stress ceases, the friction between the ferodo washers 61, 62, clutch 60 and disc 35, becomes sufficient to oppose the rotation of clutch 60; pinion 9 can no longer turn on its axis and the engine shaft 2 is coupled directly with shaft 1 as previously explained.

(c) Should the starting resistance of the battery be damaged, it suffices to fix a crank handle to the key 34 on shaft 1 and push this shaft in the direction 45 (Fig. 1$^A$); the spring 20 is thereby compressed and the teeth 19 of shaft 1 engage with the corresponding teeth 18 of shaft 2; shafts 1 and 2 can then be turned by hand for starting the internal combustion engine in the usual way.

When the crank is removed the shaft 1 returns automatically to the position shown in Fig. 1 under the action of the previously compressed spring 20.

It is to be noted that to couple shafts 1 and 2 no sliding movement is required either of shaft 30 or the armature 31 of the electric machine, so that there is no inconvenience in mounting the shaft 30 on ball bearings without play; moreover the coupling is very easy and requires no effort.

The invention extends to the mechanism for starting by means of the aforesaid crank handle, whatever the various mechanisms for transmission between the shaft of the electric machine and the engine shaft may be.

The foregoing systems described as example are of course susceptible of many variations. For example the brake jaws 51 can be replaced by any kind of brake placed between the sliding pinion 9 and the part 35 forming one with the planet pinion disc 21, during the idle time when pinion 9 is not engaged with the orbit wheel 10 nor with the part 35 forming one with the planet pinion disc 21, so that pinion 9 will always be prevented from rotating on its axis and always tend to advance in one direction or the other according to requirements.

I claim as my invention:

1. In a mechanism for starting an internal combustion engine, the combination with the engine shaft, of an electromagnetic machine, a shaft therefor adapted to be coupled with said engine shaft, a pinion on the shaft of said electromagnetic machine, a disc integral with said engine shaft, a spindle mounted in said disc parallel to the axis of the shaft of said electromagnetic machine, a planet pinion rotatably mounted on said spindle and engaging said pinion, a stationary orbit wheel, a sliding pinion threaded on said spindle and engaging said orbit wheel, means for connecting said spindle and said sliding pinion so as to move the latter on said spindle parallel with the axis thereof, and means controlled by said sliding pinion as it escapes from said orbit wheel for effecting direct connection of the shaft of said electromagnetic machine with said engine shaft.

2. In a device for starting an internal combustion engine, the combination with the engine shaft, of an electromagnetic machine, a shaft therefor adapted to be coupled with said engine shaft, a pinion on the shaft of said electromagnetic machine, a disc fixed to said engine shaft, a spindle mounted in said disc parallel with the shaft of said electromagnetic machine, a threaded sleeve loosely mounted on said spindle, a planet pinion secured to said sleeve and meshing with the pinion on the shaft of said electromagnetic machine, a stationary orbit wheel, a sliding pinion mounted on said threaded sleeve and adapted to engage said orbit wheel, and means controlled by said sliding pinion as it escapes from said orbit wheel for effecting direct connection of the shaft of said electromagnetic machine with said engine shaft.

3. In a starting mechanism for an internal combustion engine, the combination with the engine shaft, of an electromagnetic machine, a shaft therefor adapted to be coupled with said engine shaft, a pinion on the shaft of said electromagnetic machine, a disc fixed to said engine shaft, a spindle mounted in said disc parallel with the axis of the electromagnetic machine, a planet pinion rotatably mounted on said spindle and in gear with the pinion on the shaft of said electromagnetic machine, a stationary orbit wheel, a sliding pinion threaded on said spindle and adapted to bear against said planet pinion and engage said orbit wheel, means for moving said sliding pinion on said spindle parallel to the axis thereof, and means controlled by said sliding pinion as it escapes from said orbit wheel for effecting direct connection of the shaft of said electromagnetic machine with said engine shaft.

4. In a mechanism for starting an internal combustion engine, the combination with the engine shaft, of an electromagnetic machine, a shaft therefor adapted to be coupled with said engine shaft, a pinion on the shaft of said electromagnetic machine, a disc integral with said engine shaft, a spindle carried by said disc parallel with the axis of said electromagnetic machine, a planet pinion rotatably mounted on said spindle and engaged with the pinion on the shaft of said electromagnetic machine, a resilient member between said planet pinion and said disc, a stationary orbit wheel, a sliding pinion threaded on said spindle and adapted to engage said orbit wheel, a means connecting said spindle and said sliding pinion for moving said sliding pinion on said spindle parallel with the axis thereof, and means controlled by said sliding pinion as it escapes from said orbit wheel for producing direct engagement of the shaft of said electromagnetic machine with said engine shaft.

5. In a mechanism for starting an internal combustion engine, the combination with the engine shaft, of an electromagnetic machine, a shaft therefor, a pinion on the shaft of said electromagnetic machine, a disc integral with said engine shaft, a spindle carried by said disc parallel with the axis of said electromagnetic machine, a planet pinion rotatably mounted on said spindle, a pinion on the shaft of said electromagnetic machine in mesh with said planet pinion, a stationary orbit wheel, a sliding pinion threaded on said spindle and adapted to engage said orbit wheel, a resilient member between said sliding pinion and said planet pinion, means connecting said spindle and said sliding pinion so as to move said sliding pinion on said spindle parallel with the axis thereof, and means controlled by said sliding pinion as it escapes from said orbit wheel for causing direct engagement of the shaft of said electromagnetic machine with said engine shaft.

6. In a mechanism for starting an internal combustion engine, the combination with the engine shaft, of an electromagnetic machine, a shaft therefor, a pinion on the shaft of said electromagnetic machine, a disc secured to said engine shaft, a spindle mounted on said disc parallel with the axis of said electromagnetic machine, a planet pinion rotatably mounted on said spindle, a pinion on the shaft of said electromagnetic machine in mesh with said planet pinion, a stationary orbit wheel, a sliding pinion threaded on said spindle and adapted to engage said orbit wheel, a means connecting said spindle and said sliding pinion so as to move said sliding pinion on said spindle parallel with the axis thereof, coupling means on said sliding pinion, and coupling means on said disc adapted to engage said first coupling means, thereby preventing the rotation of said sliding pinion and said planet pinion relative to said disc and producing direct engagement of said engine shaft with the shaft of said electromagnetic machine.

7. In a mechanism for starting an internal combustion engine, the combination with the engine shaft, of an electromagnetic machine, a shaft therefor, a pinion on the shaft of said electromagnetic machine, a disc integral with said engine shaft, a spindle carried by said disc parallel with the axis of said electromagnetic machine, a planet pinion rotatably mounted on said spindle, a pinion on the shaft of said electromagnetic machine in engagement with said planet pinion, a stationary orbit wheel, a sliding pinion threaded on said spindle and adapted to mesh with said orbit wheel, a means for coupling said spindle and sliding pinion so as to move the latter on said spindle parallel to the axis thereof, coupling means carried by said sliding pinion, a coupling carried by said disc and adapted to engage said first coupling means, and an additional coupling means between the said second coupling means and said disc for limiting the sliding and frictional stresses.

8. In a mechanism for starting an internal combustion engine, the combination with the engine shaft, of an electromagnetic machine, a shaft therefor, a pinion carried by the shaft of said electromagnetic machine, a disc secured to said engine shaft, a spindle carried by said disc parallel with the axis of said electromagnetic machine, a planet pinion rotatably mounted on said spindle in mesh with said pinion, a stationary orbit wheel, a sliding pinion threaded on said spindle and adapted to mesh with said orbit wheel, a means for coupling said spindle and said sliding pinion so as to move said sliding pinion parallel with said spindle, a coupling means carried by said sliding pinion, a coupling means provided on said disc so as to engage with the said first coupling means, washers of friction material having a high coefficient of friction placed between said second coupling and said disc, and resilient members pressing said washers and said second coupling against said disc.

9. In a mechanism for starting an internal combustion engine, the combination with the engine shaft, of an electromagnetic machine, a shaft therefor, a pinion carried by the shaft of said electromagnetic machine, a disc secured to said engine shaft, a second disc parallel with said first disc and being integral therewith, a spindle carried by said discs parallel with the axis of said electromagnetic machine, a planet pinion rotatably mounted on said spindle in engagement with the pinion on the shaft of said electromagnetic machine, a stationary orbit wheel, a sliding pinion threaded on said spindle and adapted to engage said orbit wheel, a means for coupling said spindle and said sliding pinion so as to move said pinion parallel with the axis of said spindle, a coupling means carried by said sliding pinion, a coupling means carried by said second disc and adapted to engage said first coupling means, so as to prevent said sliding pinion and said planet pinion from rotating relative to said discs thereby producing a direct gearing of said engine shaft and the shaft of said electromagnetic machine.

10. In a starting device for an internal combustion engine, the combination with the engine shaft, of an electromagnetic machine, a shaft therefor, a pinion on the shaft of said electromagnetic machine, a member integral with said engine shaft formed with two parallel discs united by a middle part, a spindle carried by said two discs parallel with the axis of said electromagnetic machine, a planet pinion rotatably mounted on said spindle in engagement with the pinion on the shaft of said electromagnetic machine, a stationary orbit wheel, a sliding pinion threaded on said spindle and adapted to engage with said planet wheel, a means for coupling said spindle and said sliding pinion so as to move said pinion parallel with the axis thereof, a coupling means carried by said sliding pinion, a second coupling means carried by said member and adapted to engage said first coupling means so as to prevent the rotation of said sliding pinion and planet pinion relative to said discs and producing a direct engagement of said engine shaft with the shaft of said electromagnetic machine.

11. In a starting device for an internal combustion engine, the combination with the engine shaft, of an electromagnetic machine, a shaft therefor, a pinion on the shaft of said electromagnetic machine, a disc with said engine shaft, a spindle carried by said disc parallel with the axis of said electromagnetic machine, a planet pinion rotatably mounted on said spindle and adapted to engage with the pinion on the shaft of said electromagnetic machine, a stationary orbit wheel, a sliding pinion threaded on said spindle and adapted to engage with said planet wheel, a means for coupling said spindle and said sliding pinion so as to move said sliding pinion parallel with the axis thereof, a means controlled by said sliding pinion for producing direct engagement of the shaft of said electromagnetic machine and said engine shaft, and a means to brake said sliding pinion preventing its rotation during cessation of its parallel motion, when said sliding pinion is not engaged with said orbit wheel.

12. In a starting device for an internal combustion engine, the combination with the engine shaft, of an electromagnetic machine, a shaft therefor, a pinion carried by the shaft of said electromagnetic machine, a disc integral with said engine shaft, a spindle carried by said disc parallel with the axis of said electromagnetic machine, a planet pinion rotatably mounted on said spindle in mesh with the pinion on the shaft of said electromagnetic machine, a stationary orbit wheel, a sliding pinion threaded on said spindle and adapted to engage said orbit wheel, a means for connecting said spindle and said sliding pinion so as to move said sliding pinion parallel to the axis of said spindle, a means controlled by said sliding pinion for producing direct engagement of the shaft of said electromagnetic machine with said engine shaft, movable jaws on said engine shaft, a resilient member placed between said jaws and adapted to grip them on a prolongation of said sliding pinion acting as a brake on said sliding pinion preventing rotation of said sliding pinion when the latter is not engaged with said orbit wheel.

13. In a starting device for an internal combustion engine, the combination with the engine shaft of an electromagnetic machine, a frame, a hollow shaft rotatably mounted in said frame and carrying the armature of said electromagnetic machine and held against longitudinal movement, a solid shaft mounted in said hollow shaft, a means for rotatably connecting said hollow shaft and said solid shaft enabling said solid shaft to slide within said hollow shaft, a pinion formed on said solid shaft, a transmission mechanism (5, 7, 10, 21 . . . ) engaged on the one hand, with said pinion and, on the other, with said engine shaft, a coupling member placed on the end of said solid shaft and a similar coupling member on said engine shaft adapted to engage said first coupling member when said solid shaft is caused to slide in said hollow shaft.

In testimony whereof I affix my signature.
AUGUSTE DUTREUX.